Jan. 18, 1966 J. KAUFMANN 3,229,695

DOCUMENT STORING DEVICES

Filed Feb. 27, 1964 4 Sheets-Sheet 1

INVENTOR.
Josef Kaufmann
BY
Michael S. Striker
Attorney

DOCUMENT STORING DEVICES

Filed Feb. 27, 1964 4 Sheets-Sheet 2

INVENTOR.
Josef Kaufmann
BY
Michael S. Striker
Attorney

Jan. 18, 1966 J. KAUFMANN 3,229,695

DOCUMENT STORING DEVICES

Filed Feb. 27, 1964 4 Sheets-Sheet 3

INVENTOR.
Josef Kaufmann

BY Michael S. Striker
Attorney

Jan. 18, 1966 J. KAUFMANN 3,229,695

DOCUMENT STORING DEVICES

Filed Feb. 27, 1964 4 Sheets-Sheet 4

INVENTOR.
Josef Kaufmann

BY Michael S. Striker
Attorney

United States Patent Office 3,229,695

Patented Jan. 18, 1966

3,229,695

DOCUMENT STORING DEVICES

Josef Kaufmann, Dorf, Richenthal, Switzerland

Filed Feb. 27, 1964, Ser. No. 347,863
Claims priority, application Switzerland, Mar. 9, 1963, 3,076/63
10 Claims. (Cl. 129—1)

The present invention relates to document storing devices comprising compartments for accommodating files destined to be placed side by side within the compartment which is open at the top.

It is an object of the invention to provide document filing devices of simple construction, which require few simple compartment inserts or none at all, whereby also servicing and the files themselves will be simplified.

With this and other objects in view which will become apparent later from this specification and accompanying drawings, I provide a document storing device comprising in combination: a compartment open on top, document receiving files in operation placed side by side in said compartment each of said files comprising two identical cover members each having a side wall, two end walls extending at right angles to said side wall, and a bottom strip said two cover members being flexibly connected with one another, and supporting means provided on the side faces of said files and on the corresponding edges of said compartment, the supporting means of a file raised from said compartment engaging with the supporting means of adjacent files and of said compartment, respectively, and retaining said raised file in the opened position with its cover members spread apart.

In a closed condition the files form prismatic containers which are open at the top. The cover of the files advantageously may be formed as one-piece plastic mouldings.

In a particularly advantageous construction of the novel document storing device the side walls of the covers are smooth and are provided with recesses in their bottom end portion, said recesses, when a file is raised out of the compartment and its covers are spread apart, being engaged by the top marginal edge of the side walls or of the end walls of two adjacent non raised files, or a border ledge provided at the upper edge of the compartment.

Simple guide rails, such as usually employed for suspension filing systems, may also be used as border ledges fastened to the wall of the container.

Between the side walls of each file, moreover, resilient elements may be inserted and tractive members may be secured to the bottom strip of the files.

Figure 1:
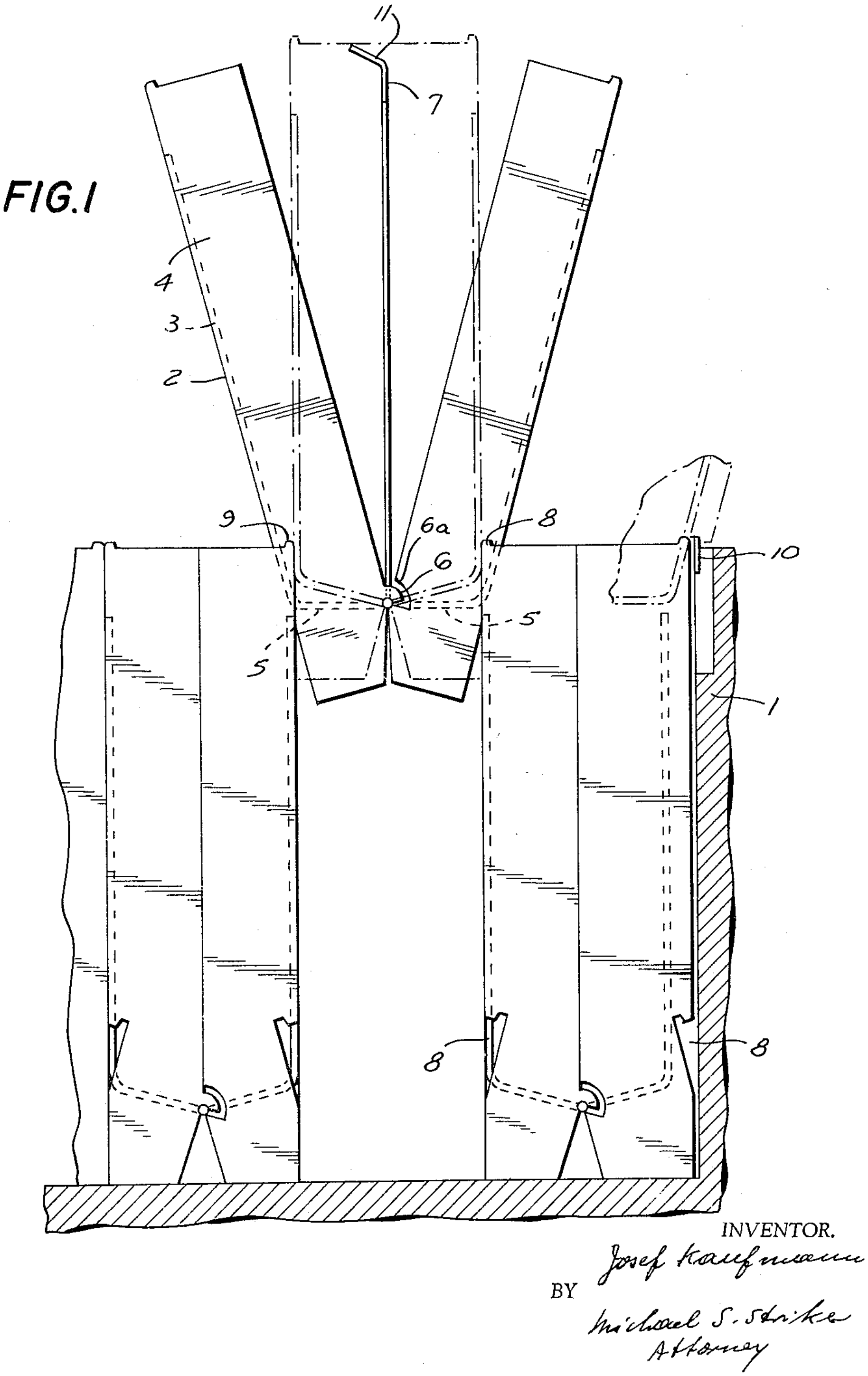
Figures 2, 4:
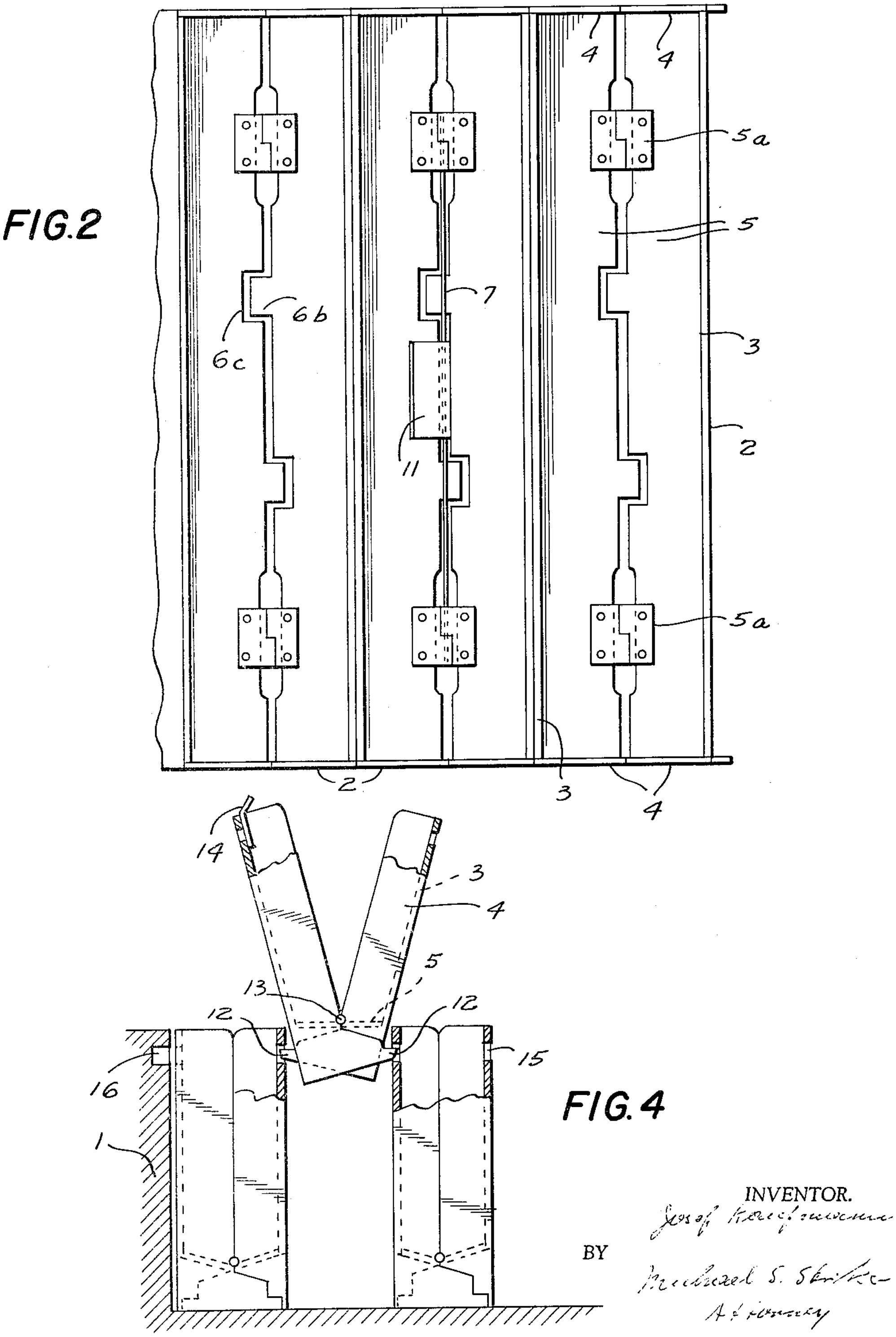
Figure 6:
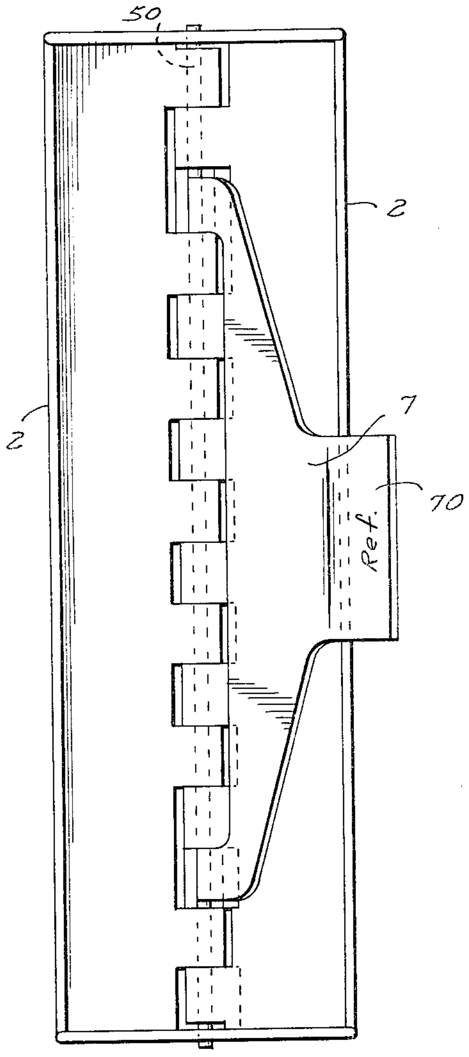
Figure 3:
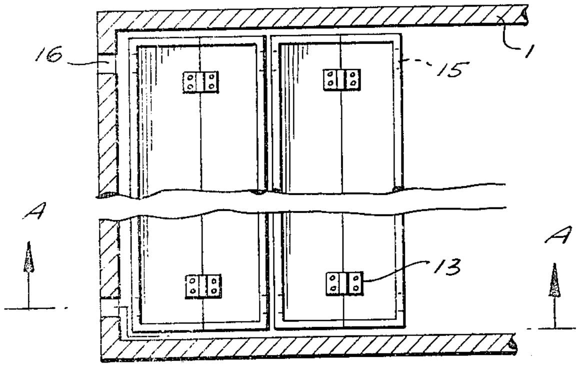
Figure 5:
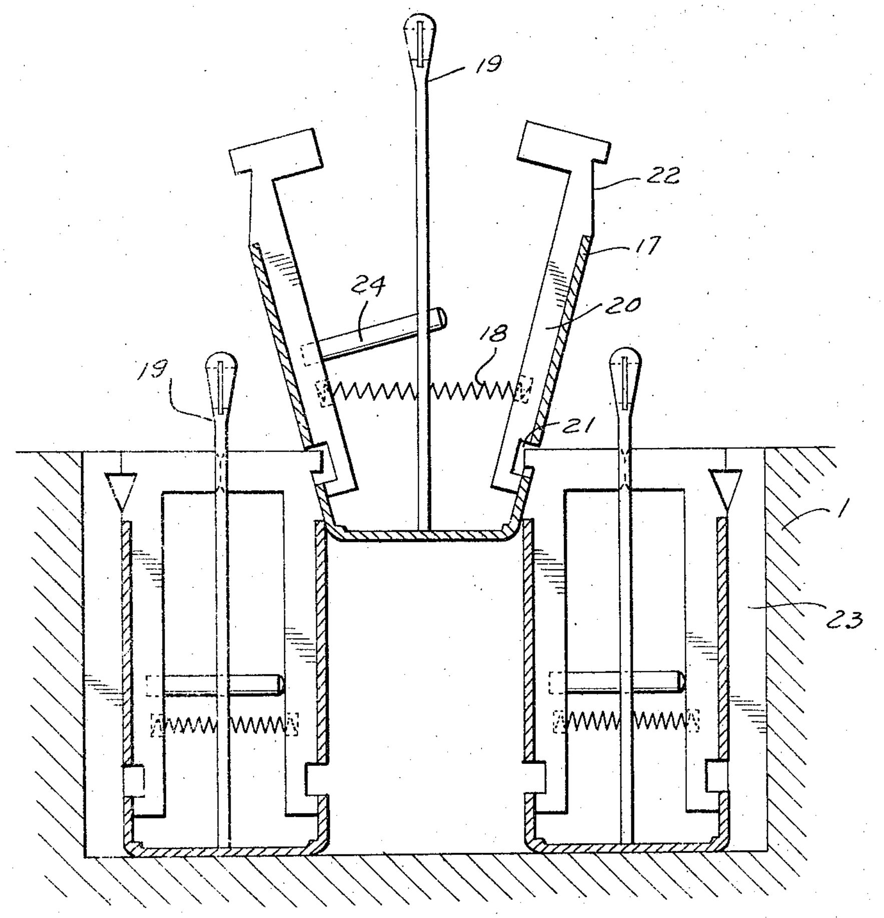

The present invention will now be described in more detail with reference to the accompanying drawings illustrating, by way of example, several embodiments of the invention. In these drawings:

FIGURE 1 is a partial section through a compartment showing files arranged side by side therein, one of the files being shown in a raised position with its covers spread apart, FIGURE 2 is a plan view of the arrangement shown in FIGURE 1, FIGURE 3 is a partial horizontal section of a first modification, FIGURE 4 shows the same modification in vertical section on the line A—A of FIGURE 3, FIGURE 5 represents a longitudinal sectional view of a further modification, FIGURE 6 is a plan view of the open side of a yet further modification of a file according to FIGURE 1.

Referring to FIGURES 1 and 2, a plurality of files are arranged in a row closely side by side in a compartment 1 which is open at the top and may be formed for example, by an opening provided in a piece of office furniture.

Each file is formed by two covers consisting of plastic mouldings 2 having side walls 3, end walls 4 turned up at right angles to the side wall 3, and bottom walls or strips 5. The bottom strips are pivotally interconnected by metal hinges 5*a*. In place of the metal hinges 5*a*, plastic hinges could be formed integrally with the bottom strip 5 themselves. Moreover, the end walls 4 of one cover 2 of each file are provided with projections 6 engaging corresponding recesses 6*a* in the other cover 2, and the bottom strips 5 are provided with interengaging projections 6*b* and recesses 6*c*, which prevent documents from falling out of the file.

When a file is raised out of the row in the compartment by means of a central grip member 7, the two covers 2 spread apart and recesses 8 provided in the lower part of the end walls 4 engage a ledge 9 on the upper margin of the adjacent file, thus the covers of the raised file are supported in their spread out position so that the contents of the file can be readily inspected.

The outer faces of the file covers are completely smooth, i.e. without any projections, no additional insert members whatsoever are, therefore, required in the compartment 1 with the exception of a border ledge 10 or short ledge sections on two opposite compartment walls for supporting the outer cover of the two end files in the compartment.

FIGURE 2 is a plan view of three files which are placed side by side in the compartment.

The grip members 7, which are attached to the hinges 5*a* of the bottom strips 5 may in addition carry inscriptions or data indicating the contents of the files. A turned-up top portion 11 is provided for this purpose.

Both halves of the file are identical except for the projection 6 and notch 6*a*, and may be produced for example as one-piece pressed or moulded articles and, when using synthetic plastic material, in the same mould.

The modified files illustrated in FIGURES 3 and 4 are formed with projections 12 at their lower ends. When a file is raised out of the compartment and opened for supporting the open file the projections 12 engage into openings 15 in the sides of an adjacent file or into a recess 16 of the compartment 1. The numeral 13 designates the hinge provided on two bottom strips 5 of the file, while a tab 14 is provided for inscribing data indicating the contents of the file, which tab may also be used for raising the file.

Naturally, other combinations of interengaging supporting elements could be provided. Thus for instance ledges may be fastened or formed on the outer faces of the end walls of the files, the bottom ends of which ledges have recesses in the edges facing each other, said recesses being adapted to engage with corresponding counterparts on the wall of the compartment or at the upper portion of adjacent files.

In the modification according to FIGURE 5 files are shown having resilient U-shaped covers 17. These covers have the tendency to spread open when a file is raised out of the compartment by means of a pull member 19, and this tendency is assisted by compression springs 18 biasing the sides of the cover apart. In this embodiment likewise, front walls 20 extending at right angles to the side walls are provided, in order to prevent the documents from shifting laterally out of the file. Supporting means are provided in the form of recesses 21 and 22 co-operating with insert ledges 23 in the compartment.

Obviously the arrangement of spring elements such as 18 (FIG. 5) between the lateral walls of each file, is also possible in files such as shown in FIGURES 1 to 4.

In order to prevent falling out of documents when the files are opened pins 24 may be fastened on the side border of one of the covers 17 or on the front walls 20 thereof, as represented in FIGURE 5.

In accordance with FIGURE 6 the covers 2 of a file are pivotally attached at the bottom strips by means of a hinge shaft 50, on which moreover an intermediate plate 7 is pivotally mounted, the upper end of which protrudes beyond the covers 2 and is constructed as a tab 70 for a label and at the same time as a carrier grip. Preferably said intermediate plate 7 is made of transparent material.

While I have herein described and illustrated in the accompanying drawings what may be considered typical and particularly advantageous embodiments of my said invention I wish to be understood that I do not limit myself to the particular details and dimensions described or illustrated, for obvious modifications will occur to a person skilled in the art.

What I claim as my invention and desire to secure by Letters Patent, is:

1. A document storing device comprising, in combination, a compartment open at the top; and a plurality of document receiving files located side by side in said compartment and liftable therefrom through said open top, each of said files having a pair of opposite substantially identical cover members having respectively side walls and means connecting said cover members in the region of their bottom ends to each other movable between a closed position in which said side walls are parallel to each other and an open position in which said side walls include an angle with each other, at least one male and at least one female engaging means provided on each cover member, one of said engaging means being located in the region of the bottom end of the respective cover member and the other in the region of the top end thereof, said male engaging means on said cover members on one file constructed to interengage with the female engaging means of the files adjacent thereto when said one file is lifted to align the engaging means in the region of the bottom ends of the cover members thereof with the engaging means in the region of the top ends of the cover members of the files adjacent thereto and when said cover members of said one file are moved to said open position so as to hold said one file in open position and partly raised out of said compartment, said engaging means being flush with said side walls of said cover members at least when said cover members are in said closed position so that side walls of adjacent files when located in said compartment may abut against each other over the whole outer surface thereof.

2. A document storing device comprising, in combination, a compartment open at the top; and a plurality of document receiving files located side by side in said compartment and liftable therefrom through said open top, each of said files having a pair of opposite substantially identical cover members having respectively side walls and means connecting said cover members in the region of their bottom ends to each other movable between a closed position in which said side walls are parallel to each other and an open position in which said side walls include an angle with each other, at least one male and at least one female engaging means provided on each cover member, said male engaging means being in the form of a projection projecting aligned with the side wall of the respective cover member from the upper edge thereof and said female engaging means being in the form of a cutout in the respective cover member adjacent the bottom end thereof, said male engaging means on said cover members on one file constructed to interengage with the female engaging means of the files adjacent thereto when said one file is lifted to align the engaging means in the region of the bottom ends of the cover members thereof with the engaging means in the region of the top ends of the cover members of the files adjacent thereto and when said cover members of said one file are moved to said open position so as to hold said one file in open position and partly raised out of said compartment, said side walls of adjacent files when located in said compartment abutting against each other over the whole outer surface thereof.

3. A document storing device comprising, in combination, a compartment open at the top; and a plurality of document receiving files located side by side in said compartment and liftable therefrom through said open top, each of said files having a pair of opposite substantially identical cover members, each having a side wall, a pair of end walls extending from opposite edges of said side wall substantially normal to the latter and a bottom wall, hinge means connecting the bottom walls of opposite cover members of one file to each other so that said cover members may move between a closed position in which the side walls thereof are parallel to each other and free edges of said end walls engage each other and an open position in which said side walls are inclined at an angle with respect to each other, at least one male and at least one female engaging means provided on each cover member, said male engaging means being in the form of a projection projecting upwardly from the respective wall aligned therewith and said female engaging means being in the form of a cutout extending from the side wall into at least one end wall of the respective cover member, said male engaging means on said cover members on one file constructed to interengage with the female engaging means of the files adjacent thereto when said one file is lifted to align the engaging means in the region of the bottom ends of the cover members thereof with the engaging means in the region of the top ends of the cover members of the files adjacent thereto and when said cover members of said one file are moved to said open position so as to hold said one file in open position and partly raised out of said compartment, said engaging means being flush with said side walls of said cover members at least when said cover members are in said closed position so that side walls of adjacent files when located in said compartment may abut against each other over the whole outer surface thereof.

4. A document storing device comprising, in combination, a compartment open at the top, and a plurality of document receiving files located side by side in said compartment and liftable therefrom through said open top, each of said files having a pair of opposite substantially identical cover members, each having a side wall, a pair of end walls extending from opposite edges of said side wall substantially normal to the latter and a bottom wall, hinge means connecting the bottom walls of opposite cover members of one file to each other so that said cover members may move between a closed position in which the side walls thereof are parallel to each other and free edges of said end walls engage each other and an open position in which said side walls are inclined at an angle with respect to each other, at least one male and at least one female engaging means provided on each cover member, said male engaging means being in the form of a projection projecting upwardly from the respective side wall aligned therewith and said female engaging means being in the form of a cutout extending from the side wall into at least one end wall of the respective cover member, each end wall of each cover member having a portion projecting downwardly beyond the bottom wall, the projecting portions of the end walls of one cover member of one file having free edges facing the free edges of the projecting portions on the opposite cover member, said free edges meeting in the region of said hinges and extending when said opposite cover members are in said closed position at an angle with respect to each other so as to engage each other over the whole length thereof when said opposite cover members are in said open position to limit thereby opening of said cover members, said male engaging means on said cover members on one file constructed to interengage with the female engaging means of the files adjacent thereto when said one file is lifted to align the engaging means in the region of the bottom ends of the cover members thereof with the engaging means in the region of the top ends of the cover members of the files adjacent thereto and when said cover members of said one file are moved to said open position so as to hold said one file in open position and partly raised out of said compartment, said engaging means being flush with said side walls of said cover members at least when said cover members are in said closed position so that side walls of adjacent files when located in said compartment may abut against each other over the whole outer surface thereof.

5. A document storing device as set forth in claim 4, wherein said projecting portions of said end walls have bottom edges substantially normal to the respective side wall, said files in said compartment resting on said bottom edges keeping thereby said cover members in said closed position.

6. A document storing device as set forth in claim 3 and including a plate connected at the lower end thereof to said hinge means and projecting from said lower end between said cover members upwardly at least up to the top ends of the latter.

7. A document storing device as set forth in claim 6 and including handle means at the top end of said plate.

8. A document storing device as set forth in claim 6 and including a tab arranged at a top portion of said plate.

9. A document storing device comprising, in combination, a compartment open at the top; and a plurality of document receiving files located side by side in said compartment and liftable therefrom through said open top, each of said files having a pair of opposite substantially identical cover members, each having a side wall, a pair of end walls extending from opposite edges of said side wall substantially normal to the latter, and a bottom wall, hinge means connecting the bottom walls of opposite cover members of one file to each other so that said cover members may move between a closed position in which the side walls thereof are parallel to each other and an open position in which said side walls are inclined at an angle with respect to each other, each end wall of each cover member of one file having a portion projecting downwardly beyond the bottom wall of the respective cover member and laterally beyond the projecting portion of the corresponding end wall of the opposite cover member of said one file, each projecting portion on one cover member forming a male engaging means located when said cover members are in said closed position inwardly of the side wall of the opposite cover member and projecting beyond said side wall of said opposite cover member when said cover members are in said open position, each of said side walls being formed in the region of the top end thereof with a pair of openings therethrough forming female engaging means and said male engaging means on said cover member on one file constructed to interengage with the female engaging means on the files adjacent thereto when said one file is lifted to align said male engaging means on said one file with said female engaging means on the files adjacent thereto and when said cover members of said one file are moved to said open position so as to hold said one file in open position and partly raised out of said compartment, said side walls of adjacent files when located in said compartment abutting against each other over the whole outer surface thereof.

10. A document storing device as set forth in claim 1 and including compression spring means located between and engaging with opposite ends thereof said opposite cover members and tending to move said cover members to said open position thereof.

References Cited by the Examiner

UNITED STATES PATENTS

| | | | |
|---|---|---|---|
| 1,069,469 | 8/1913 | Ratner | 129—16 |
| 1,284,520 | 11/1918 | Wigginton | 129—1 |
| 1,437,955 | 12/1922 | Banschbach | 129—1 |
| 1,749,376 | 3/1930 | Lisle | 129—1 |
| 3,132,649 | 5/1964 | Gits. | |

WALTER A. SCHEEL, *Primary Examiner.*

JEROME SCHNALL, *Examiner.*